United States Patent [19]
Frame et al.

[11] Patent Number: 5,454,111
[45] Date of Patent: * Sep. 26, 1995

[54] DOUBLE UNEQUAL BUS TIMEOUT

[75] Inventors: Robert C. Frame, Westboro; Fernando A. Zayas, Stow, both of Mass.

[73] Assignee: Quantum Corp., Milpitas, Calif.

[ * ] Notice: The portion of the term of this patent subsequent to Apr. 5, 2011 has been disclaimed.

[21] Appl. No.: 170,846

[22] Filed: Dec. 21, 1993

Related U.S. Application Data

[63] Continuation of Ser. No. 550,206, Jul. 9, 1990, which is a continuation of Ser. No. 192,651, May 11, 1988.

[51] Int. Cl.$^6$ .................................................. G06F 13/368
[52] U.S. Cl. .................... 395/288; 395/550; 395/299; 395/727; 364/267.9; 364/267; 364/240.4; 364/240
[58] Field of Search ..................... 364/DIG. 1, DIG. 2; 395/200, 275, 325, 550, 575, 725; 340/825.5

[56] References Cited

U.S. PATENT DOCUMENTS

| | | | |
|---|---|---|---|
| 4,085,448 | 4/1978 | Kogge | 364/DIG. 1 |
| 4,117,459 | 9/1978 | Douglas et al. | 364/DIG. 1 |
| 4,363,094 | 12/1982 | Kaul et al. | 364/DIG. 1 |
| 4,365,294 | 12/1982 | Stokken | 364/DIG. 1 |
| 4,419,724 | 12/1983 | Branigin et al. | 364/DIG. 1 |
| 4,438,494 | 3/1984 | Budde et al. | 364/DIG. 1 |
| 4,454,581 | 6/1984 | Nystrom | 364/DIG. 1 |
| 4,481,580 | 11/1984 | Martin et al. | 364/DIG. 1 |
| 4,503,535 | 3/1985 | Budde et al. | 364/DIG. 1 |
| 4,521,848 | 6/1985 | Bruce et al. | 364/DIG. 1 |
| 4,562,535 | 12/1985 | Vincent et al. | 364/DIG. 1 |
| 4,620,278 | 10/1986 | Ellsworth et al. | 395/325 |
| 4,633,392 | 12/1986 | Vincent et al. | 395/325 |
| 4,719,569 | 1/1988 | Ludemann et al. | 395/725 |
| 4,779,089 | 10/1988 | Theus | 340/825.5 |
| 4,787,032 | 11/1988 | Culley | 395/725 |
| 4,799,052 | 1/1989 | Near et al. | 340/825.52 |
| 4,872,004 | 10/1989 | Bahnick et al. | 340/825.5 |
| 4,967,344 | 10/1990 | Scavezze et al. | 395/575 |
| 4,988,990 | 1/1991 | Warrior | 340/25.5 |
| 5,029,074 | 7/1991 | Maskas et al. | 395/325 |
| 5,138,611 | 8/1992 | Carn et al. | 370/60 |
| 5,140,680 | 8/1992 | Best | 395/325 |
| 5,276,814 | 1/1994 | Bourke et al. | 395/275 |
| 5,301,329 | 4/1994 | Frame et al. | 395/725 |

OTHER PUBLICATIONS

U. Mayer, "Schottky–Baustein Regelt Den Buszugriff," Elektronik, vol. 32, No. 16, Aug. 1983, Munich, pp. 63–66.

*Primary Examiner*—Thomas G. Black
*Assistant Examiner*—Maria N. Von Buhr
*Attorney, Agent, or Firm*—David B. Harrison

[57] ABSTRACT

A method and arrangement for preventing the locking out of devices which are coupled to a bus by either of two of the devices which have become initiator and target devices respectively. The devices arbitrate for control of the bus after the bus enters a bus free phase. The device which wins the arbitration becomes an initiator. A timer in each device on the bus is started upon the initiation of arbitration. The initiator device is removed from the bus when an elapsed time after the timers have been started reaches a predetermined value. The distributed clock of the invention ensures that the devices coupled to the bus will clear the bus after the initiator has been on the bus for a pre-determined time, thereby obviating skew problems associated with single clocked systems.

24 Claims, 2 Drawing Sheets

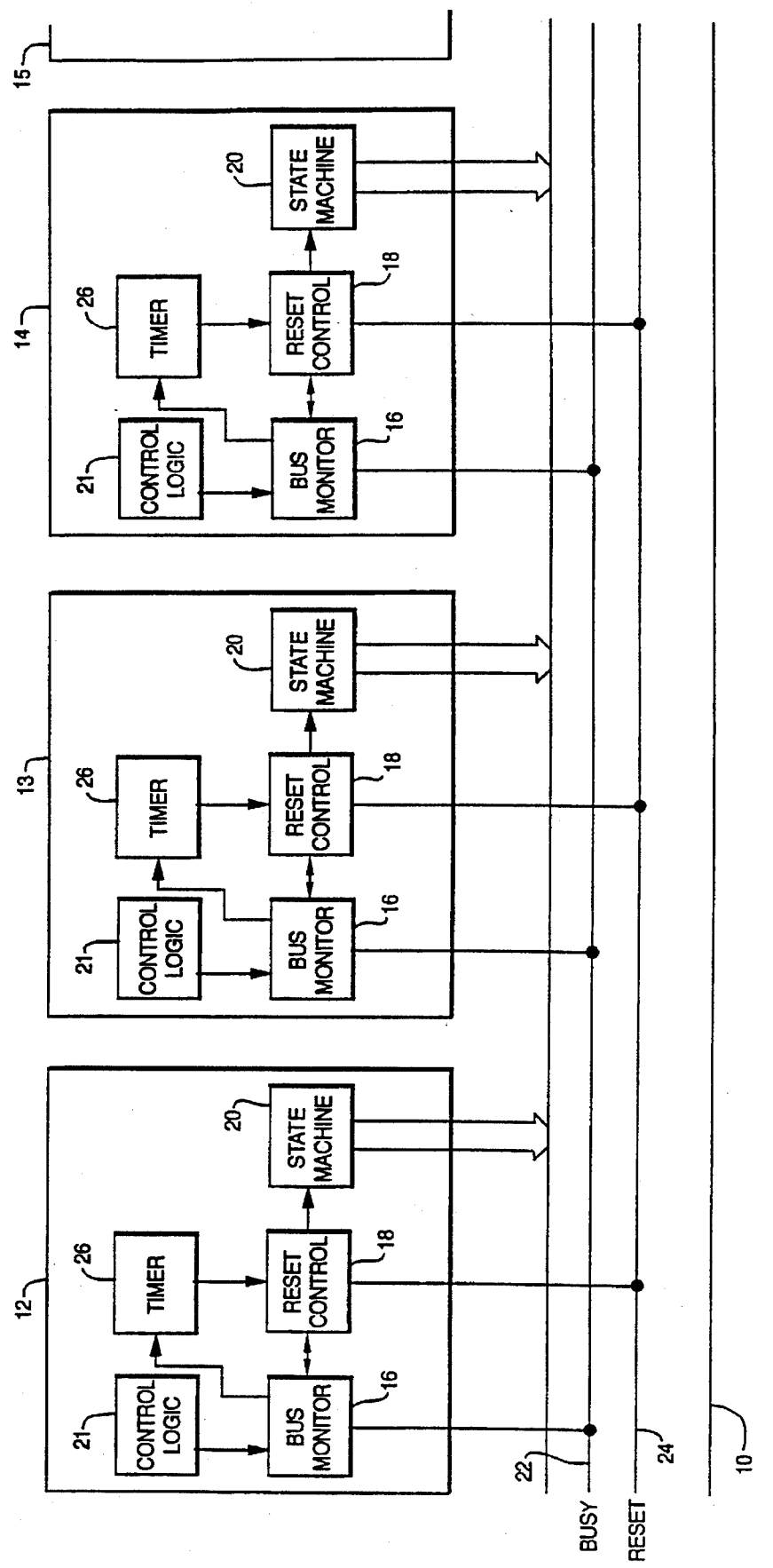

DOUBLE UNEQUAL BUS TIMEOUT

This is a continuation Ser. No. 07/550,206 filed on Jul. 9, 1990 of Robert C. Frame and Fernando A. Zayas entitled "Double Unequal Bus Timeout" which is a continuation of 07/192,651 filed on May 11, 1988 entitled "Double Unequal Bus Timeout" now abandoned.

FIELD OF THE INVENTION

The present invention relates to the field of interconnect busses for computers, and specifically, to a method and apparatus for restricting the time allotted for devices on the bus to perform a transfer, and for enforcement of this restriction.

BACKGROUND OF THE INVENTION

Modern computer systems often have many devices linked together by a common bus. These devices use the bus to establish communication with each other and transfer information between one another. A timeout is an action taken by a bus system to free the bus for use if one or more devices maintains control of the bus for too long a period of time. This can happen, for example, if the device using the bus stalls and does not remove itself from the bus.

A method is needed for forcing off of a bus those devices which have maintained control of the bus for too long a period of time. One such method of timing out has been to have each device which has taken control of the bus remove itself from the bus when it has maintained control for too long a period of time. However, if the timer on this device malfunctions so that the device keeps maintaining control of the bus, the bus will be effectively locked up; since no other device on the bus forces the stalled device off of the bus.

In some prior art arrangements, a reset causes the state machines which drive and control the bus of all the devices connected to the bus to be cleared. However, this clearing is a drastic measure and should be avoided to the greatest extent possible since the state machines must be brought back to the condition they were in when the reset signal was asserted.

SUMMARY OF THE INVENTION

It is an objective of the present invention to provide a bus timeout system in which more than one device monitors the use of the bus by devices involved in a transfer, so that if a problem occurs the bus can be cleared for use by the other devices connected to the bus.

A further objective of the present invention is to provide a bus timeout system in which a resetting of the state machines of the devices is avoided to the greatest extent possible.

These and other objectives are achieved by the present invention which provides a method and arrangement for preventing the locking up of a bus by devices coupled to the bus, each of the devices having state machines. Each device coupled to the bus includes at least one bus monitor and at least one timer. A bus monitor monitors a busy line of the bus. A timer that is coupled to and controlled by the bus monitor keeps track of the time elapsed after the bus monitor has started the timer in response to a signal on the bus busy line. An initiator timeout signal is issued by the timer when a pre-determined time period has elapsed after the timer was started. A reset control is coupled to the state machines for receiving the initiator timeout signal and clearing the state machines of at least one device when the initiator timeout signal is asserted.

The method and arrangement of the present invention achieve the stated objectives and have the stated advantages. Also, a target timeout is provided in certain embodiments. The target timeout allows only the state machines of the target to be cleared, thereby avoiding a resetting of the state machines of all the devices connected to the bus in most instances.

BRIEF DESCRIPTION OF THE DRAWINGS

FIG. 1 is a block diagram of an embodiment of the present invention.

DETAILED DESCRIPTION

Figure 3:
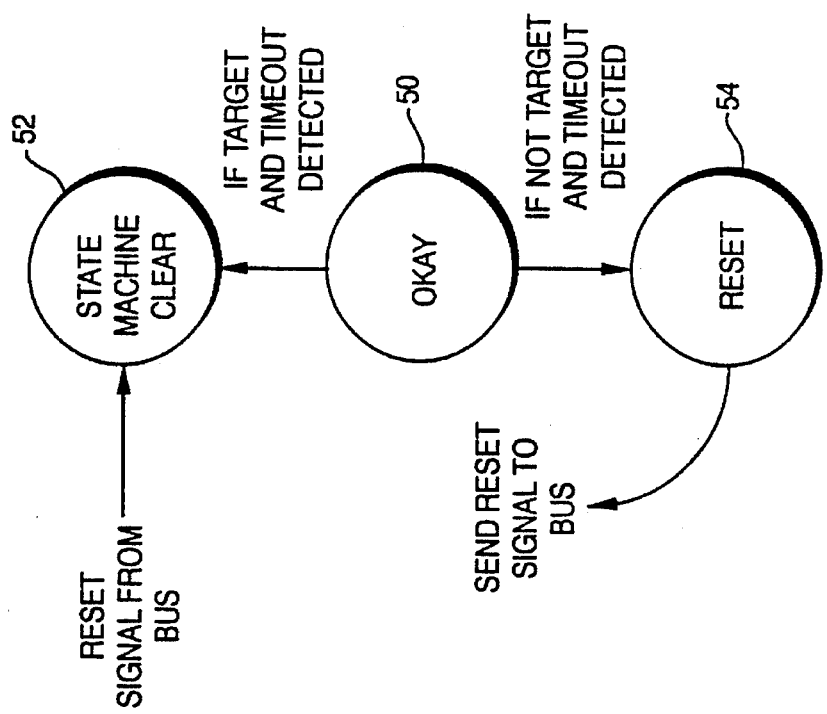
FIG. 3 is a state diagram of a reset control used in the present invention.

An embodiment of the present invention is shown in FIG. 1, in which a plurality of devices 12, 13, 14 and 15 are connected to a common bus 10. Although four devices are illustrated as connected to the bus 10 in this exemplary embodiment, a different number of devices can be connected to the bus 10 without departing from the scope of the invention. These devices can be, for example, central processing units, peripheral memory storage units, etc. Each of the devices 12–15 includes a bus monitor 16, a reset control 18, control logic 21 and at least one state machine 20. Each bus monitor 16 is connected to a busy line 22 on the bus 10. Likewise, each reset control 18 is connected to a reset line 24 on the bus 10. Any of the devices 12–15 can serve as either an initiator or a target of a transfer between the devices.

The basic operation of the system of FIG. 1 is as follows. When two or more devices, 12 and 14 for example, both wish to become an initiator as indicated by the control logic 21, they arbitrate for control of the bus 10. At the same time, the arbitrating devices 12 and 14 assert a busy signal on busy line 22. One of the devices 12 or 14 will win the arbitration and become an initiator. The initiator selects a target, for example device 13, which assumes responsibility for maintaining the assertion of the bus busy signal on busy line 22. A transfer of information between device 13 and device 12 is then made. Thereafter, the device 13 de-asserts the bus busy signal on busy line 22. This allows the above process to repeat.

As one can readily surmise, a problem occurs if either the initiator or target keeps asserting a bus busy signal on the busy line 22. This can occur due to a breakdown in one of the devices, for example. This would prevent other devices from using the bus 10 and effectively lock up the bus 10. To solve this problem, the present invention implements a timeout scheme for the transaction between the initiator and the target such that if the bus has been tied up by either the initiator or target for too long a period of time, the timeout expires and the bus becomes freed for use by other initiators and targets. The invention implements this timeout control by using a timer 26 in each of the devices 12–15. The timers 26 are connected to the bus monitors 16 and the reset controls 18. The starting and resetting of the timer 26 is controlled by the bus monitor 16. When the timer 26 reaches a predetermined time after being started by the bus monitor 16, the timer 26 sends a timeout signal to the reset control 18.

As stated before, each of the reset controls 18 is connected to the reset line 24 of the bus 10. Whenever the reset signal is asserted on the reset line 24 by any one of the reset controls 18, the reset controls 18 in each of the devices 12–15 will clear the state machines closest to the bus in their respective devices. Any one of the reset controls 18 can assert the device's reset signal on the reset line 24 in response to an initiator timeout signal received from its own timer 26. In this way, each of the devices 12–15 monitors the length of time of a transfer.

Figure 2:
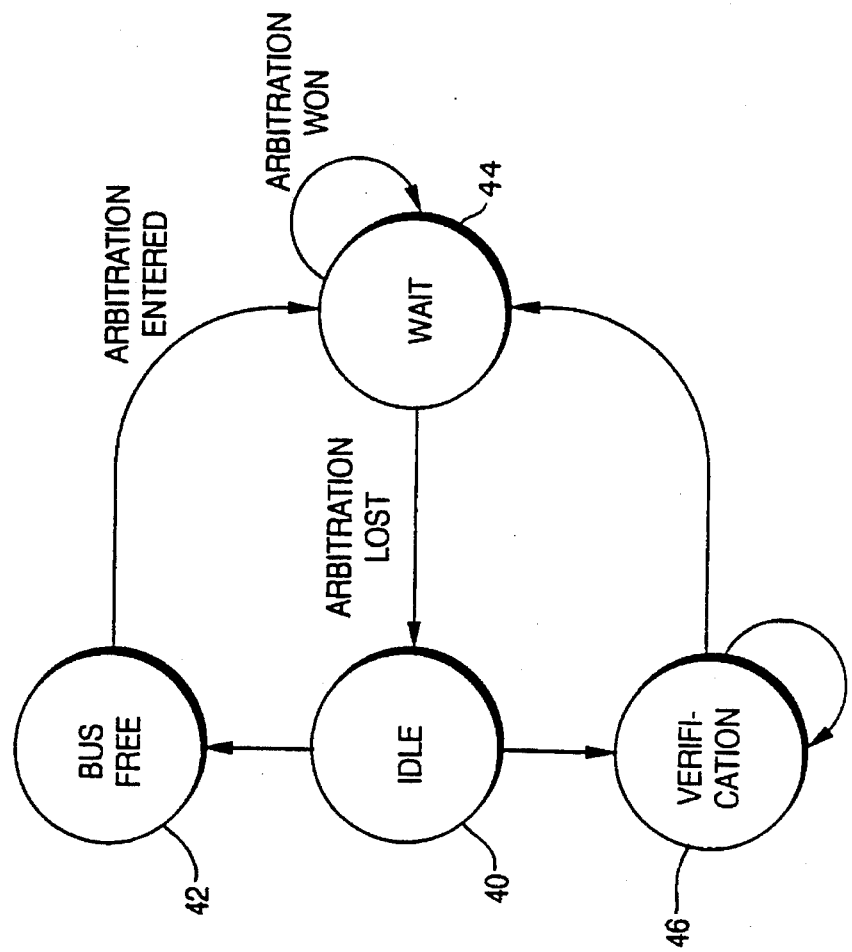
FIG. 2 is a state diagram of a bus monitor used in the present invention.

The state diagram of a bus monitor 16 for any one of the devices is shown in FIG. 2, while a state diagram of the reset control 18 for any one of the devices is shown in FIG. 3. The physical implementation of the bus monitor 16 and the reset control 18 (as well as timer 26) can be done in any number of ways by one of ordinary skill in the art, using the state diagrams of FIG. 2 and FIG. 3 as a guide, and are thus not depicted here so as not to obscure the invention.

As seen in FIG. 2, the bus monitor 16 normally resides in either an idle state 40 or a bus free state 42 depending on the condition of the bus. The timer 26, which always runs, is continuously reset by the monitor 16 when the monitor 16 is in the idle state 40, unless the device wants to arbitrate for control of the bus.

The bus monitors 16 of all of the other devices which also want to arbitrate at this time for the bus 10 have also entered the bus free state 42, and arbitration begins. The bus monitor 16 then enters the wait state 44, waiting for the arbitration among the devices to be finished. The device which wins the arbitration becomes an initiator of a transfer, and its bus monitor 16 stays in the wait state 44. The bus monitors 16 of the devices which lost in the arbitration return to the idle state 40. Note that the timer 26 still remains running in all of the devices which wanted to arbitrate for command of the bus. By this procedure, the initiator for a transfer is chosen, while all of the other devices which want to take command of the bus, as well as the winner of the arbitration, continue to monitor the time that the bus is not free. What happens when the time reaches a first pre-determined value will be described later.

The selection of a target and the monitoring of a timeout period for that target (a target timeout) during which the target should complete the transaction is as follows. Any of the devices other than the initiator, even those which have lost the arbitration, can become a target for transfer. All of the devices except for the initiator have their bus monitors 16 in the idle state 40. After winning the arbitration, the initiator will assert on the bus 10 its own ID bit and the ID bit of the selected target, along with a parity bit. While in the idle state, all of the bus monitors 16 of the individual devices look for whether their own ID bit is set on the bus 10, and whether any other ID bit (the initiator bit) and the parity bit are also set. If the bus monitor 16 for a particular device sees that its own ID bit is set, along with another ID bit and the parity bit, then the bus monitor 16 for that particular device enters a verification state 46. If during the verification state 46 the device cannot verify that it is the target, the bus monitor 16 returns to the idle state 40.

If the bus monitor 16 verifies after 400 nsec that its device is the target during the verification state 46, the timer 26 is once again reset and then started. The bus monitor 16 of the target then enters the wait phase 44 while the transfer is made between the initiator and target. In the meantime, the timer 26 of the target continues to run freely. When the timer 26 of the target reaches a second predetermined count, for example 1.8 msec, the timer 26 of the target will send a target timeout signal to the reset control 18. Otherwise, assuming a transfer is completed within the allotted time periods so that none of the timers 26 sends a timeout signal to their respective reset controls 18, the bus monitors 16 of both the initiator and target return to the idle state 40 and the arbitration and transfer process can begin again.

Having described the control of the timer 26 by the bus monitor 16 to send out the appropriate timeout signals for the initiator, the target and the other devices, the state diagram and operation of the reset control 18 will be described using FIG. 3. Normally, the reset control 18 resides in an "okay" state 50. When a device 12–15 is a target in a transfer, its own timer 26 is running and will send a target timeout signal to the reset control 18 if a second pre-determined time has passed since the device became a target. Upon receiving the target timeout signal from the timer 26, the reset control 18 of only the target device changes states from the okay state 50 to a state machine clear state 52 while the reset controls 18 of the other devices on the bus 10 remain unaffected by this timeout signal. When the reset control 18 of the target enters the state machine clear state 52, the state machine 20 of the target device only is cleared. By clearing the state machine 20, the target device is put back into the state it was in before the transfer was attempted. The state machine clear state 52 is also entered whenever the reset control 18 receives a reset signal. The reset control 18 of the target then sends a signal to the bus monitor 16 of the target which deasserts the busy signal. This removes the target device from the bus 10 and allows the bus 10 to go idle so that all of the devices can now arbitrate for the bus 10.

Although the state machine 20 of the target is cleared when a target timeout occurs, none of the state machines 20 of the other devices on the bus 10 are cleared because of the target timeout. The other devices only see that the bus is now free for arbitration and use.

The same does not hold true for the case when the time for the entire transfer, beginning when the bus is being arbitrated for, takes too long. Once the bus is in the bus free condition and the devices begin arbitrating for control of the bus, the timers 26 of all of the devices which want to take control of the bus start counting. If there is a problem with the transfer such that for some reason the target did not time out and remove itself from the bus and the attempted transfer has taken too long, the timers 26 of the remaining devices, including the initiator, will send an initiator timeout signal to their own reset controls 18. These initiator timeout signals are issued when the timer reaches the first pre-determined value. By having each of the devices monitor the timing of the entire transfer, there is a redundancy in the enforcement of the time allotted to each transfer. Thus, if either the initiator or the target completely breaks down such that neither of them times out, any and all of the remaining devices that want to take control of the bus will assert a reset so that the bus 10 will be cleared for use.

As stated before, normally the reset controls 18 of the initiator and the other devices are in the okay state 50. When an initiator timeout signal is asserted by the respective timers 26, the reset controls 18 enter a reset state 54 and assert a reset signal on the reset line 24.

Once the reset signal is asserted on the reset line 24 by any one (or all) of the reset controls 18, both the initiator and the target will clear their state machines. Also, all of the other devices will clear their own state machines which drive and control the bus at this time. Such a resetting in which all of the devices have their state machines cleared should be avoided to the greatest extent possible. This is why resetting all of the devices occurs only when the entire transfer time expires (the initiator timeout). If it is only the target timer which expires, the target merely removes itself from the bus 10 so that the bus 10 becomes free, and all of the state machines of the other devices remain intact.

By the above described invention, the time allotted for devices to perform a transfer and tie up a bus is limited, and is enforced by all of the devices on the bus in a distributed timer arrangement.

We claim:

1. A method for preventing the locking out of devices which are coupled to a bus by either of two of said devices which have become initiator and target devices, the method comprising the steps of:

(a) arbitrating between said devices for control of said bus after the bus enters a bus free phase;

(b) starting a timer in each of said devices upon initiation of arbitration for control of the bus;

(c) granting control of the bus to one of said devices, thereby causing it to become said initiator device; and (d) removing said initiator device from said bus when an elapsed time after any one of said timers have been started reaches a first pre-determined value.

2. A method for preventing a device from locking out one or more other devices which are coupled to a bus, the method comprising the steps of:

arbitrating among all the devices coupled to the bus to identify said device having a highest predetermined priority and thereby granting said device control of the bus;

starting a timer in each of said other devices once said device is granted control of the bus; and resetting the bus if a timer of any of said other devices reaches a first predetermined value.

3. The method of claim 2 further comprising the step of monitoring the bus to determine when the bus is in a bus free state.

4. The method of claim 2 wherein the step of arbitrating among all the devices further comprises the step of asserting control of the bus by an initiator device.

5. The method of claim 2 wherein the step of resetting the bus comprises the step of asserting a reset signal on the bus by any one of said other devices whose timer has reached the first predetermined time.

6. The method of claim 5 further comprising the step of placing a state machine in the device which asserts the reset signal on the bus in a predetermined state.

7. The method of claim 5 further comprising the step of placing a state machine, in each of the plurality of devices on the bus which receives the reset signal in a predetermined state.

8. The method of claim 5 wherein the step of resetting the bus further comprises the step of deasserting control of the bus by the device which has asserted control of the bus responsive to the reset signal being asserted on the bus.

9. The method of claim 5 wherein the step of deasserting control of the bus comprises the step of deasserting the bus busy signal.

10. The method of claim 2 further comprising the steps of:

asserting control of the bus by a target device;

measuring elapsed time with the timer of the target device which is asserting control of the bus; and deasserting control of the bus by the target device if the elapsed time of the target device timer reaches a second pre-determined value.

11. The method of claim 10 wherein the step of asserting control of the bus comprises the step of asserting a bus busy signal on the bus by the target device.

12. The method of claim 11 wherein the step of deasserting control of the bus by the target device comprises the step of resetting the target device.

13. The method of claim 10 wherein the first predetermined value is greater than the second predetermined value.

14. A method for preventing a device from locking out one or more other devices which are coupled to a bus, the method comprising the steps of:

arbitrating among a plurality of devices for a right to become an initiator device;

starting a timer in each of the plurality of devices arbitrating for the right to become an initiator; and resetting the bus if elapsed time in any of the timers reaches a first predetermined value.

15. The method of claim 14 further comprising the step of monitoring the bus to determine when the bus is in a bus free state.

16. The method of claim 14 further comprising the steps of:

selecting a target device by the initiator device during arbitration; and asserting control of the bus by the target device upon the target device being selected by the initiator device.

17. The method of claim 16 wherein the step of resetting the bus comprises the step of a non-target device whose timer has reached the first predetermined value asserting a reset signal on the bus.

18. The method of claim 17 further comprising the step of placing a state machine, in the device which asserts the reset signal on the bus, in a predetermined state.

19. The method of claim 17 further comprising the step of placing a state machine, in each device on the bus which receives the reset signal, in a predetermined state.

20. The method of claim 17 wherein the step of resetting the bus further comprises the step of the target device de-asserting control of the bus responsive to the reset signal being asserted on the bus.

21. In a computer system including a system bus and a plurality of devices, each one of the plurality of devices coupled to the bus for selectively controlling the bus, each device of the plurality of devices comprising:

timing means for keeping elapsed time with respect to the initiation of a bus arbitration request signal generated by a device desiring to control the bus and for issuing a first timeout signal if a first predetermined time period has elapsed; and a reset control, coupled to the timing means and the bus, for receiving the first timeout signal and responding to it by issuing a reset signal on the bus such that, by issuing the reset signal, the device causes the bus to be placed in condition for one of the plurality of devices to obtain control of the bus.

22. The device of claim 21 wherein the device further comprises one or more resettable elements coupled to the reset control wherein the reset control detects a reset signal placed on the bus by another device and resets one or more of the resettable elements in response to detecting the reset signal.

23. The device of claim 22 wherein one or more of the resettable elements comprises a state machine.

24. The device of claim 21 wherein the device further comprises one or more resettable elements coupled to the reset control and wherein the reset control resets one or more of the resettable elements in response to receiving a first timeout signal from the timing means.

* * * * *